United States Patent [19]

Lussiez et al.

[11] Patent Number: 4,810,303
[45] Date of Patent: Mar. 7, 1989

[54] PRODUCTION OF HEXAGONAL CADMIUM SULFIDE PIGMENT

[75] Inventors: Guy W. Lussiez, St. Louis, Mo.; Eddie C. Chou; Leo W. Beckstead, both of Arvada, Colo.

[73] Assignee: Amax Inc., New York, N.Y.

[21] Appl. No.: 101,456

[22] Filed: Sep. 28, 1987

[51] Int. Cl.$^4$ ............................................... C09C 1/10
[52] U.S. Cl. ..................................... 106/452; 106/400
[58] Field of Search ...................... 106/301, 309, 452

[56] References Cited

U.S. PATENT DOCUMENTS 2,578,363  6/1946  Marcot ................................. 106/301
3,012,899 12/1961  Giordano ............................. 106/301
3,852,404 12/1974  Daly .................................... 106/301

OTHER PUBLICATIONS

Derwent Abstract, Abstract No. 85-200796/33, "Cadmium Sulphide Preparation", Japanese Patent No. J60127234-A, 7/6/1985.

Derwent Abstract, Abstract No. 84-304574/49, "Cadmium Sulphide for Electrophotography Mfr", Japanese Patent No. J59191063-A, 10/30/1984.

Primary Examiner—Paul Lieberman
Assistant Examiner—Christine A. Skane
Attorney, Agent, or Firm—Michael A. Ciomek; Eugene J. Kalil

[57] ABSTRACT

Hexagonal cadmium sulfide, a bright yellow pigment useful in high temperature processing, is produced by reacting cadmium sulfate solution with a solution of a soluble sulfide under pressure and at a temperature of about 250° C.

5 Claims, 1 Drawing Sheet

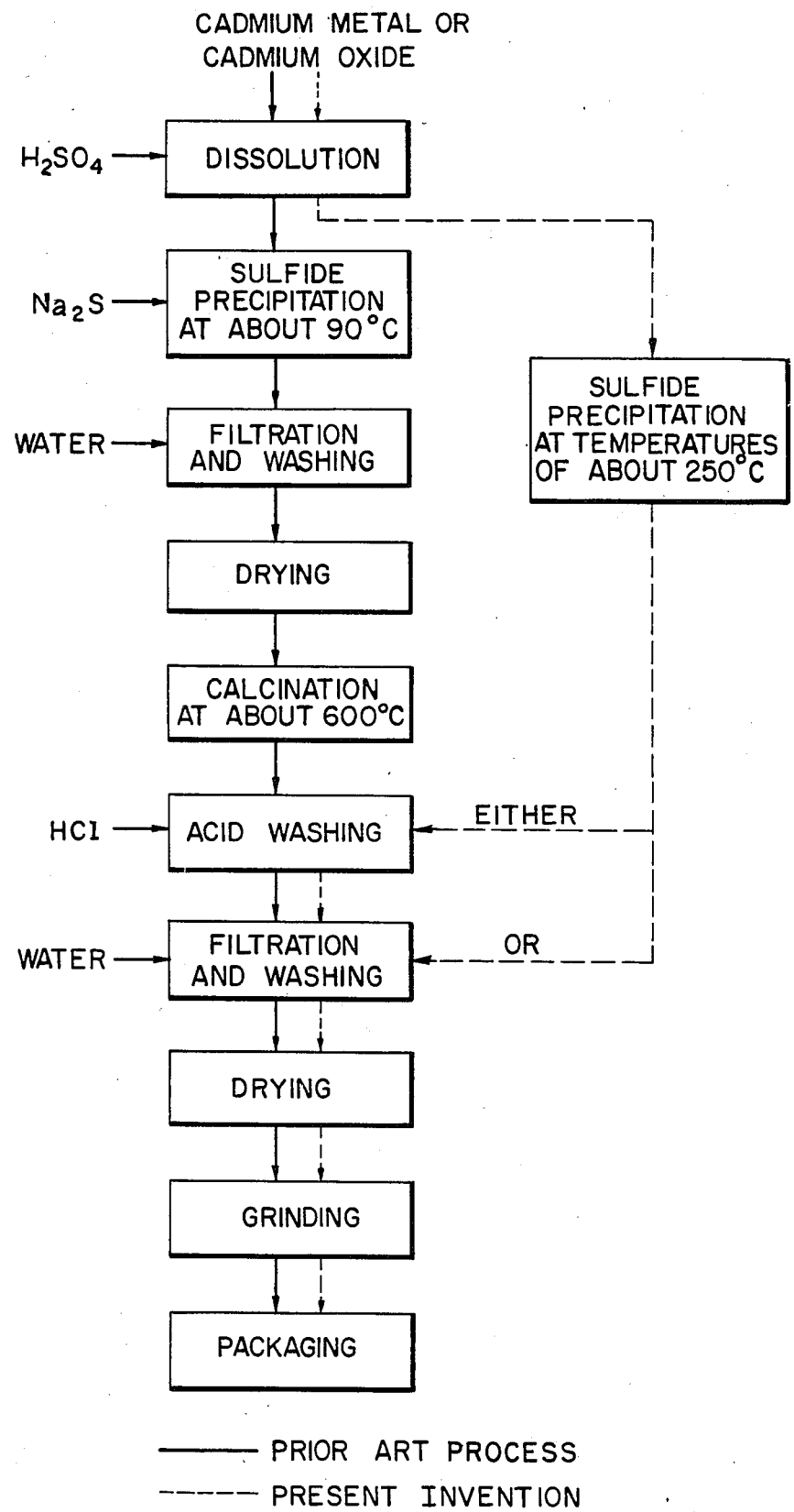

PRODUCTION OF HEXAGONAL CADMIUM SULFIDE PIGMENT

BACKGROUND OF THE INVENTION AND THE PRIOR ART

Cadmium pigments are stable inorganic coloring agents and are useful in high-temperature processing. Cadmium pigments primarily are used in plastics but also are used in some coating and ceramics. Cadmium pigments are based upon the compound cadmium sulfide (CdS), which produces a golden yellow pigment. Partial substitution of cadmium by zinc or mercury and substitution of sulfur by selenium form a series of compounds in a range of lemon-yellow, orange, red, and maroon. Cadmium sulfide is the primary ingredient of various types of high-temperature pigments.

Chemically, there are two types of cadmium sulfide, cubic CdS and hexagonal CdS. The high-temperature stable hexagonal CdS is the only one used in the pigment industry. Hexagonal CdS can be obtained by calcinating cubic CdS at about 600° C. and also by sulfide precipitation from halide solutions. However, the resulting hexagonal CdS from halide solutions cannot be washed free of halides. Each of the current U.S. pigment manufacturers has developed various proprietary methods for generating pigments with particular color shades and properties, but the production of all cadmium pigments is structured around one generic process which consists of dissolution of cadmium metal or cadmium oxide in acid, sulfide precipitation at about 90° C. to form cubic CdS, filtration and washing, drying, calcination at about 600° C., acid washing for removal of soluble cadmium, filtration and washing, drying, blending and grinding. The process is complicated and cost intensive, especially during the calcination stage. Without proper control, the transformation of cubic CdS to hexagonal CdS would not be complete and some of the cadmium sulfide could be oxidized.

SUMMARY OF THE INVENTION

In accordance with the invention, hexagonal cadmium sulfide is prepared directly by sulfide precipitation from a cadmium sulfate solution in a pressure vessel at temperatures of about 250° C. Numerous unit operations currently utilized in producing hexagonal CdS are eliminated in carrying out the present process.

BRIEF DESCRIPTION OF THE DRAWING

The drawing comprises a flowsheet showing the prior art process for producing hexagonal cadmium sulfide pigments and has superimposed thereon a flowsheet showing the simplified process of the present invention.

DETAILED DESCRIPTION OF THE INVENTION

In accordance with the invention, a cadmium sulfate solution, prepared, for example, by dissolving cadmium oxide in a stoichiometric quantity of sulfuric acid and containing about 100 to about 250 gpl cadmium, and about 0 to about 100 gpl sulfuric acid, is introduced into an autoclave, the autoclave is closed, agitation is started and the solution heated to the desired temperature of about 250° C. A soluble sulfide is then introduced, preferably as a water solution into the pressurized vessel using, for example, an overpressure of nitrogen. The sulfide preferably is $Na_2S$, although other soluble sulfides of sodium or potassium, e.g., NaHS, $K_2S$, $(NH_4)_2S$ may be used. Hydrogen sulfide may be used but creates handling problems. Preferably, the sulfide is supplied as a water solution containing the soluble sulfide in the amount slightly less than the solubility of the sulfide at 25° C. It is preferred to preheat the sulfide solution to a temperature of at least about 80° to 90° C. to avoid cooling the autoclave temperature below that at which the desired product, hexagonal CdS, is produced. The mixture is reacted at temperature for about 1 to about 4 hours, the autoclave is cooled, pressure is released and the product slurry filtered. The precipitate can be washed and refiltered to provide the bright yellow hexagonal CdS.

Examples will now be given.

In each test, 500 ml of the cadmium sulfate feed solution was placed in a 2-liter titanium autoclave. An additional 150 ml of water, or water plus sulfuric acid, was added to the feed solution, effectively decreasing the initial feed concentration to about 175 g/l Cd. Acid was added with the water in some tests in order to investigate the effect of pH on the reaction. After addition of this solution, the autoclave was closed, agitation was started, and the solution was heated to the desired temperature. Using an autoclave bomb assembly, approximately 600 ml of sodium sulfide solution was injected into the reactor using an overpressure of nitrogen. The addition of sodium sulfide started the precipitation reaction. The sodium sulfide solution previously had been prepared by dissolving fused sodium sulfide flake in water and then diluting with water to 600 ml total. In some of the tests, the amount of sodium sulfide used was varied in order to study this parameter. The timing of the reaction was begun when the sodium sulfide solution was injected into the autoclave. Due to the large volume of the sodium sulfide solution, there was a significant decrease in the autoclave temperature. Depending on the initial temperature, approximately 15 to 30 minutes were required for the temperature to return to the initial temperature, during which time the reaction was proceeding. After completion of the test, the autoclave was cooled, the pressure was released, and the slurry was filtered. The solids were repulped in 250 ml of hot water, refiltered, and washed twice with 250 ml of hot water each time. Typically, the filtration process was very slow, and the wet filter cakes contained 30 to 40 percent moisture. The solids were analyzed for sodium to determine the effectiveness of the repulping and washing steps, and the filtrate was analyzed for cadmium in order to determine the extent of precipitation.

Visual observation of the product with regard to color was a good indication of the purity of the product. Products that were bright yellow in color were assumed to contain mostly hexagonal cadmium sulfide, while products more orange in color were assumed to contain some cubical cadmium sulfide. Each product was analyzed by X-ray diffraction to determine which form of cadmium sulfide had been made and to what extent. As with visual observations, the X-ray results were somewhat qualitative in that the peaks for cubical and hexagonal cadmium sulfide tend to overlap. However, a very strong peak typical only of well formed hexagonal cadmium sulfide was identified. Another peak typical of cubical cadmium sulfide was also identified. In addition, a commercial product (Ciba-Geigy) was used for comparative purposes. For one or two products made in the testing sequence, the peak typical of cubical cadmium sulfide was completely absent, while the peak typical for hexagonal cadmium sulfide was very strong. These two products were used as standards, and estimates were made of the extent of cubical and hexagonal cadmium sulfide in the other products. The X-ray pattern of these two products was superior to the X-ray pattern of the commercial cadmium sulfide. However, the commercial material apparently had been ground, so that some peak broadening in the X-ray pattern would be expected.

Results of the experiments run to produce cadmium sulfide are summarized in the Table. Test conditions and the approximate percentage of hexagonal cadmium sulfide in the product, based on X-ray data, are shown in the Table. Not shown is the final cadmium in solution. In all of the tests, the final cadmium in solution was less than 4 ppm, which indicates that essentially 100 percent conversion to cadmium sulfide was obtained. The dry weight of products from each test was about 145 grams, which indicates that 100 percent yield of CdS was obtained. The first five tests (4 through 8) were run to study the effects of pH and sodium sulfide addition on the production of cadmium sulfide at 2 hours reaction time and 250° C. The best cadmium sulfide was made in Tests 5 and 7. In Test 5, 15 ml of concentrated sulfuric acid was added to the feed solution, which resulted in a final filtrate pH of 9.4. In Test 7, the acid addition was further increased, but the sodium sulfide addition was also increased. The net effect was to produce a final filtrate pH of 10.6. The pH effect apparently masked the effect of sodium sulfide in this and other tests. In Test 4, the final filtrate pH was 13.5; while in Tests 6 and 8, the final filtrate pH's were 1.9 and 1.5, respectively. Based on these results, the optimum final solution pH apparently should be about 9 to 11. Other test results shown in the Table lend further support to this conclusion, although the pH range from about 2 to 9 was not investigated due to the experimental methods used.

Interestingly, the products made in the lower pH ranges filtered faster.

The next grouping of six tests shown in the Table (11A, 5, 12A, 11B, 10B, and 12B) illustrate the effect of temperature on the production of hexagonal cadmium sulfide at two acid levels. For both levels of acid addition, increasing the temperature increased the yield of hexagonal cadmium sulfide, especially in Test 12A. In this test, pure hexagonal cadmium sulfide was made. Also note that better products were made at higher pH's.

The last grouping of six tests (note that some test results are shown twice to illustrate trends) shown in the Table (9A, 5, 10A, 9B, 6, and 10B) illustrate the effect of time of reaction at 250° C. and two levels of acid addition. For both levels of acid addition, the yield of hexagonal cadmium sulfide was greater for the longer time of reaction. Also, the yield of hexagonal cadmium sulfide was greater at higher pH. Note that the best products made in the study were from Tests 10A and 12A, run for 4 hours at 250° C. and 2 hours at 270° C., respectively. These two products compare favorably to the commercial material. The products made in the autoclaves were typically granular and crystalline and would require some grinding.

The results of these tests demonstrate that essentially pure hexagonal cadmium sulfide can be made using sulfide precipitation in an autoclave.

Reference to the drawing shows that the process of the present invention is much simpler and requires far fewer operational steps than does the known process. The present process is not only more economical than the known process but is also easier to control and thereby improves product quality.

What is claimed is:

1. The process for producing hexagonal cadmium sulfide pigment which comprises reacting an acidic cadmium sulfate solution in a closed pressure vessel with a solution of soluble sulfide at elevated pressure and a temperature of about 250° C. to about 270° C. to produce hexagonal cadmium sulfide without calcination.

2. The process in accordance with claim 1, wherein said soluble sulfide is sodium sulfide.

3. The process in accordance with claim 1, wherein the reaction medium containing said cadmium sulfate is acidified with sulfuric acid.

TABLE

| Test No. | Variables Studied | $H_2SO_4$, ml | Final pH | $Na_2S$, Times Stoichiometry | Time, Hours | Temperature, °C. | Product Color | Na, % | Hexagonal CdS, % |
|---|---|---|---|---|---|---|---|---|---|
| 4 | pH and $Na_2S$ | 0 | 13.5 | 1.05 | 2 | 250 | Yellow-Orange | 0.115 | 39 |
| 5 | Addition | 15 | 9.4 | 1.05 | 2 | 250 | Yellow-Orange | 0.011 | 71 |
| 6 | | 30 | 1.9 | 1.05 | 2 | 250 | Yellow-Orange | 0.011 | 45 |
| 7 | | 30 | 10.6 | 1.25 | 2 | 250 | Yellow | 0.039 | 83 |
| 8 | | 30 | 1.5 | 0.85 | 2 | 250 | Yellow-Orange | 0.025 | 31 |
| 11A | Reaction | 15 | 11.1 | 1.05 | 2 | 230 | Yellow-Orange | 0.058 | 60 |
| 5 | Time | 15 | 9.4 | 1.05 | 2 | 250 | Yellow-Orange | 0.011 | 71 |
| 12A | | 15 | 11.3 | 1.05 | 2 | 270 | Yellow | 0.030 | 100 |
| 11B | | 30 | 1.7 | 1.05 | 2 | 230 | Yellow-Orange | 0.048 | 27 |
| 10B | | 30 | 1.8 | 1.05 | 2 | 250 | Yellow-Orange | 0.036 | 58 |
| 12B | | 30 | 1.8 | 1.05 | 2 | 270 | Yellow-Orange | 0.030 | 60 |
| 9A | Reaction | 15 | 9.9 | 1.05 | 1 | 250 | Yellow-Orange | 0.068 | 54 |
| 5 | Temperature | 15 | 9.4 | 1.05 | 2 | 250 | Yellow | 0.011 | 71 |
| 10A | | 15 | 10.0 | 1.05 | 4 | 250 | Yellow | 0.025 | 100 |
| 9B | | 30 | 1.8 | 1.05 | 1 | 250 | Yellow-Orange | 0.065 | 42 |
| 6 | | 30 | 1.9 | 1.05 | 2 | 250 | Yellow-Orange | 0.011 | 45 |
| 10B | | 30 | 1.8 | 1.05 | 4 | 250 | Yellow-Orange | 0.036 | 58 |

4. The process in accordance with claim 3, wherein the proportion of acidic and basic ingredients in said reaction medium is controlled to provide a final pH between about pH 9 and pH 11.

5. The process in accordance with claim 1, wherein said soluble sulfide solution is preheated to about 80° to about 90° C.

* * * * *